April 22, 1958     L. HUNTER, JR     2,831,298
VEHICLE TIRE TRUING APPARATUS
Filed June 20, 1955     4 Sheets-Sheet 3
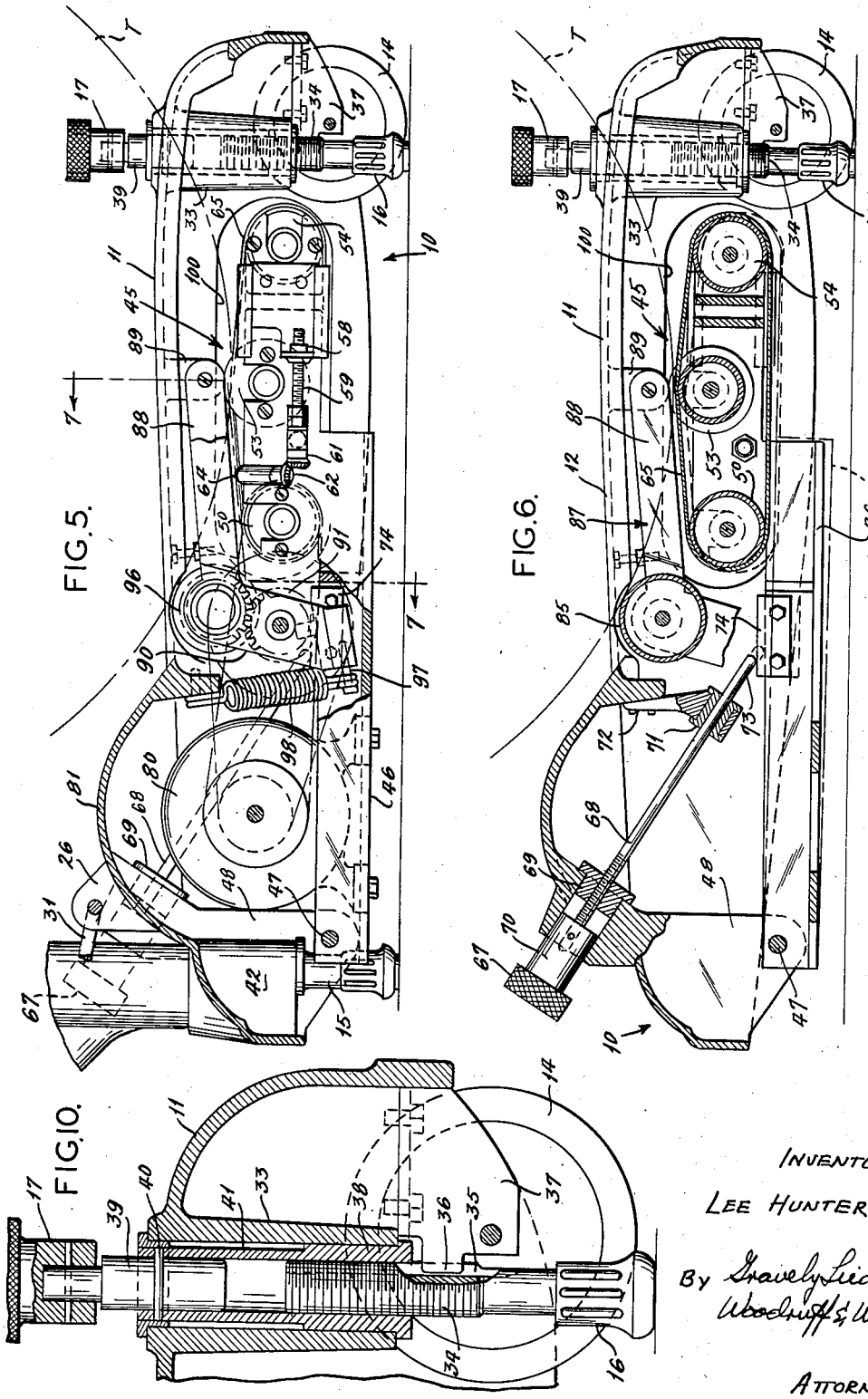
INVENTOR.
LEE HUNTER JR.
By Gravely Lieder
Woodruff & Wills
ATTORNEYS.

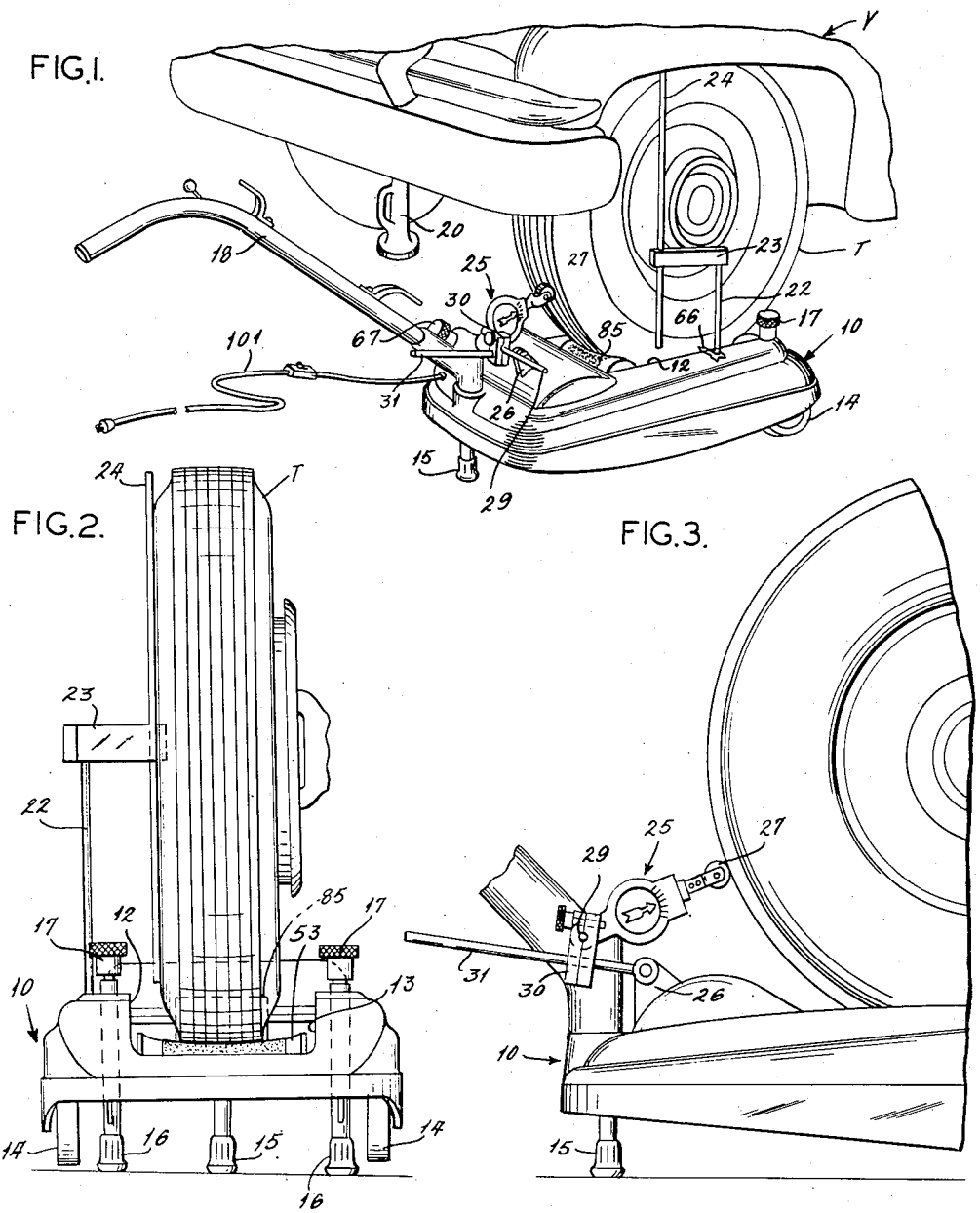

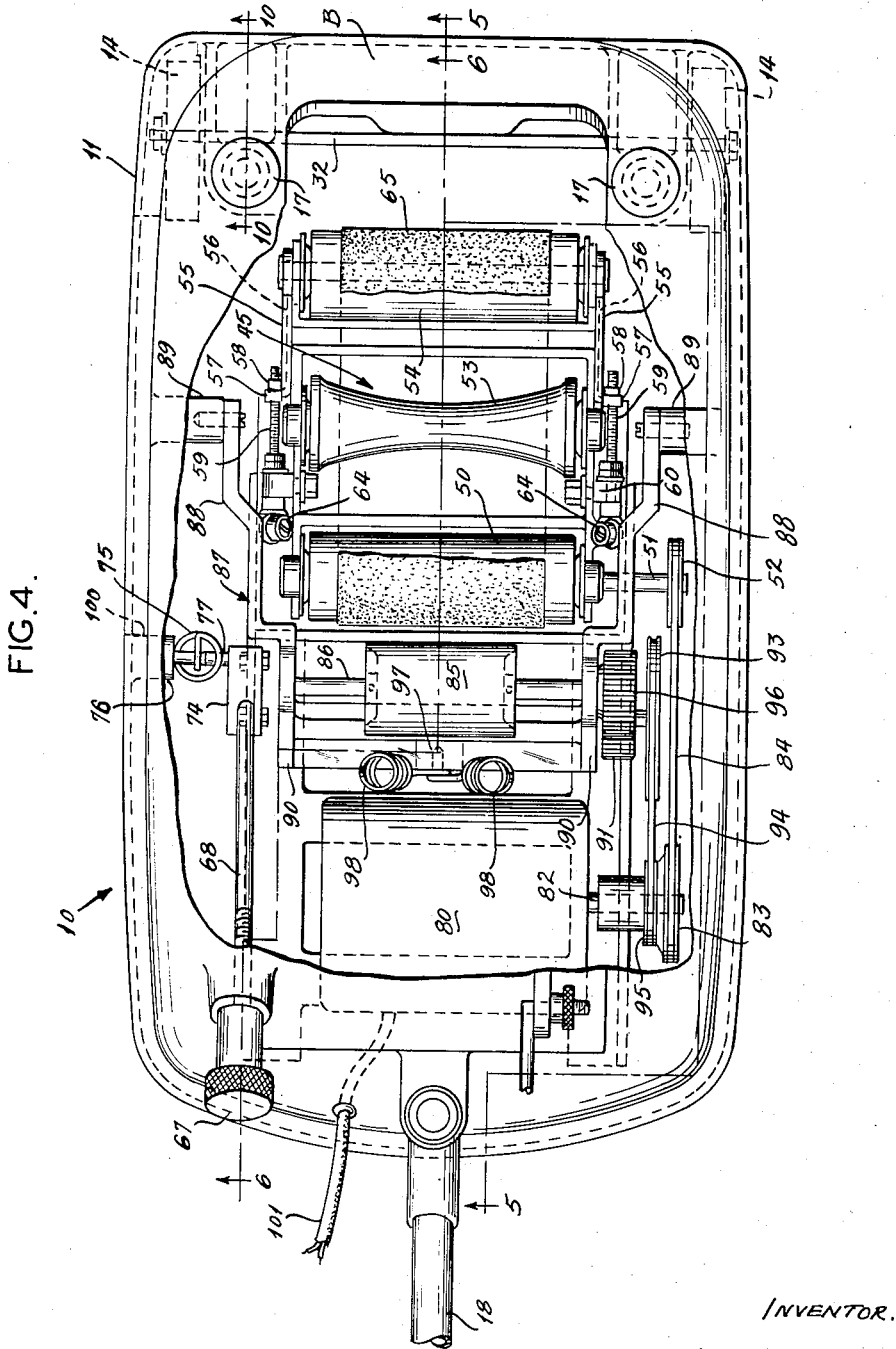

April 22, 1958 L. HUNTER, JR 2,831,298
VEHICLE TIRE TRUING APPARATUS
Filed June 20, 1955 4 Sheets-Sheet 4

INVENTOR.
LEE HUNTER JR.

By Gravely Lieder Woodruff & Wills
ATTORNEYS

United States Patent Office 2,831,298
Patented Apr. 22, 1958

2,831,298

VEHICLE TIRE TRUING APPARATUS

Lee Hunter, Jr., St. Louis County, Mo.

Application June 20, 1955, Serial No. 516,488

4 Claims. (Cl. 51—179)

This invention relates to apparatus for truing vehicle tires, and particularly for rounding tire treads.

The invention is concerned with the provision of apparatus for rounding tire treads so that better wheel balancing can be obtained.

The invention is also concerned with the provision of apparatus for rounding tire treads while the tire is mounted on its wheel so that the tire tread may be rounded in relation to wheel rotation.

It is an object to provide apparatus which will operate quickly and accurately upon new or old tires to correct faults in tire treads so that vibration may be reduced and unnecessary wear also may be reduced.

It is another object to provide tire tread rounding apparatus which will handle natural or synthetic tire materials and can be operated with the tire on the vehicle.

These and other objects will be more fully understood from the following detailed description of one embodiment of the invention.

The invention consists generally in apparatus which may be positioned in an attitude which is squared to the plane of wheel and tire rotation, so that tread grinding means in the apparatus can be made to round off the tread to the desired condition for the tire. The invention further consists in grinding means which can be adjusted to control the extent and rate of tire tread grinding, and in means associated with the grinding means to determine where on the tread grinding is needed to result in accurate rounding or truing of the tread. The invention also consists in those parts and combination of parts hereinafter pointed out.

A preferred embodiment of the present invention is illustrated in the drawings wherein:

Fig. 1 is a fragmentary perspective view of a portion of a vehicle illustrating the present apparatus in operating relationship to the wheel of such vehicle;

Fig. 2 is an end elevational view of a vehicle wheel and the present truing apparatus;

Fig. 3 is a fragmentary side elevational view of the present apparatus shown in Fig. 1;

Fig. 4 is a top plan view of the apparatus, with portions of the structure broken away to reveal certain internal details thereof;

Fig. 5 is a longitudinal sectional elevational view taken along the line 5—5 in Fig. 4;

Fig. 6 is a further longitudinal sectional elevational view as seen along line 6—6 in Fig. 4;

Fig. 10 is a fragmentary enlarged sectional elevational view of a typical adjustable leg, the view being taken at line 10—10 in Fig. 4 for the present apparatus.

Figure 7:
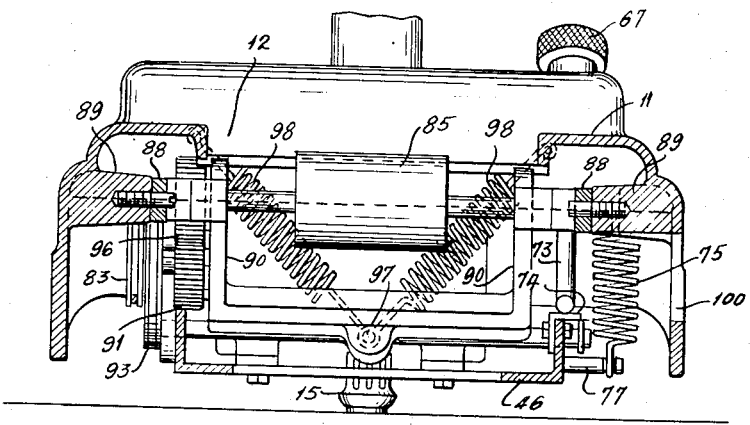
Fig. 7 is a transverse sectional elevational view taken along the line 7—7 in Fig. 5.

The presently preferred embodiment of this invention is illustrated to advantage in Figs. 1, 2 and 3. The apparatus is disclosed generally at 10 and comprises a body frame 11 of suitable cast construction to provide an opening in the top portion at 12 and a tire receiving notch 13 at one end of the said opening 12 so that the body of the apparatus may be moved in under a vehicle tire shown at T upon suitable wheels or rollers 14 pivoted in the forward end of the body 11. The rearward end of the body 11 is provided with a fixed foot 15, and the forward end thereof, in addition to the wheels 14, is provided inwardly of each wheel with an adjustable foot 16 controlled by a suitable knob 17. Obviously, the adjustable feet 16 are adapted to be retracted when the apparatus 10 is moved about on the wheels 14. A suitable swivel-mounted handle 18 is provided for the apparatus 10, the handle 18 being arranged to swing about a vertical pivot so that it can be moved to one side or the other of the position shown in Fig. 1.

The apparatus shown generally at 10 is adapted to be rolled under a vehicle tire T after the vehicle has been jacked up and set on fixed supports such as the support 20 shown in Fig. 1. A support 20 will of course be used inside each of the tire and wheel assemblies so that the vehicle shown generally at V will be rigidly suspended with its tires sufficiently clear of the ground to permit the apparatus 10 to pass therebeneath. The frame or body 11 is adapted to carry grinding means within the opening 12 and inwardly of the notch 13, such grinding means coming into contact with the tire tread under controlled conditions.

In order to bring the apparatus 10 and the tire T into a condition where the axis of the tire is parallel with the axis of the grinding roll, such roll to be hereinafter described in detail, the apparatus 10 is provided with a plumb gauge. The plumb gauge consists in a support rod 22 rigidly fixed in the frame 11 to support an arm 23 at its upper end. The arm 23 is adapted to swing in a horizontal plane about the support rod 22, and the arm carries a plumb bar 24 which is adjustable in the end of the arm 23 so that the outer extremities of the plumb bar can be located to contact the tire side wall region close to zones which are diametrically opposite. It will be observed in Figs. 1 and 2 that the plumb bar 24 has been adjusted by tilting the apparatus 10 on the adjustable feet 16 to a position where it just touches the tire side walls at top and bottom.

In order to facilitate grinding of the tire tread, apparatus 10 is further provided with a runout gauge shown generally at 25, such gauge being adjustably mounted on a suitable support 26 which is a part of the frame 11. The runout gauge includes a gauge roller 27 which can be adjusted into contact with the tire tread so that the gauge needle 28 will respond to the position of the roller 27 as it detects the presence of high and low spots in the tire tread. It is preferred to have the roller 27 of fairly narrow width, and to provide lateral adjustment of the runout gauge 25 by means of the adjusting rod 29 which is fixed to the runout gauge and adjustably clamped in means 30 which is, in turn, supported on a bar 31 arranged at right angles to the rod 29. In this way, the runout gauge 25 may be adjusted across the width of the tire tread so that any given portion of the tire tread may be examined without producing false readings on the gauge due to the presence of high or low spots in the tire tread at adjacent portions. This permits making corrections in a setting between the tire and the grinding means in the apparatus 10 to suit the condition of the tire tread.

Reference will now be made to Figs. 4, 5 and 6 in particular and to other views of the drawings as thought necessary. The body 11 of the apparatus 10 is supported at its forward end by means of wheels 14 which are mounted in any suitable manner upon an axle 32. Just inwardly of each of the wheels 14 the casting 11 is provided with depending bosses 33 for the purpose of adjustably mounting the feet 16. Since these feet 16 are essentially the same in detail, it is believed necessary to describe only one thereof. In Fig. 10 it is to be observed that the adjustable foot 16 is integrally formed with a threaded shank 34 having a longitudinal keyway 35 to receive the key 36 formed on a fixed key plate 37. The key plate 37 is attached to the adjacent structure of the frame 11 as is indicated. The boss 33 is provided with a lower threaded bushing 38, and this bushing 38 is adapted to be rotated without longitudinal displacement in the boss 33 by rotation of the adjusting knob 17 rotating a pin 39 which is in turn connected by the upper pin 40 of the means 41 adapted to rotate bushing 38. It is clear that rotation in either direction of the knob 17 will cause a similar rotation of the bushing 38 and, because the shank 34 cannot rotate, the shank will be advanced or retracted relative to the frame 11 for the purpose above pointed out.

The opposite end of the frame 11 is provided with a boss 42 which is adapted to receive and support the fixed foot 15 in a position below the swivel connection between handle and frame. The notch 13 which is adapted to receive the tire is located between the adjustable feet 16 and in line with a grinding assembly 45 disposed within the opening 12.

The grinding assembly 45, reference being made to Figs. 4, 5, 6, 8 and 9 includes a frame 46 having its rearward end connected by a pivot shaft 47 to depending ears 48 in the frame 11. The forward end of frame 46 carries a power roll 50 suitably journaled at its opposite ends, and having a projecting drive shaft 51 at one end for carrying a driven pulley 52. A formed grinding roll 53 is suitably journaled in the frame in fixed spaced relation with the power roll 50. On the opposite side of the grinding roll 53 from the power roll 50 there is provided an idler roll 54 of adjustable type. The opposite ends of the idler roll 54 are suitably journaled in adjustable bearings, one typical adjustable bearing being shown in Figs. 8 and 9 to which reference will now be directed. The frame 46 carries a guide 55 to receive a slide block 56. The slide block 56 is provided at its outer end with a yoke 57 in which the idler roll bearing is mounted. The inner end of the slide block 56 is formed with an out-turned lug 57' in which a threaded element 58 is fixed. The thread element 58 is adapted to be engaged by one end of a threaded shaft 59 which, in turn is journaled adjacent to its other end in a fixed bearing 60, and the other end of the threaded shaft 59 carries a miter gear 61 which is engaged by a second miter gear 62. The axis of rotation of the miter gear 62 is angularly related with the axis of the shaft 59, and the miter gear 62 is mounted in a boss 63 in the frame 46 so as to be directed angularly upwardly and inwardly toward the opening 12 in the frame 11 so that a slotted screwdriver shaft 64 may be rendered accessible through the opening 12. Rotation of the shaft 64 will rotate the shaft 59, and this shaft 59 will act through the fixed nut 58 to cause inward or outward motion of the adjacent end of the idler roll 54. Since the opposite ends of the idler roll 54 are thus independently adjustably mounted on the frame 46, it is necessary to adjust each end of the idler roll a small amount so that the roll will not become bound in the frame or cause damage to the slide blocks 56 because of being forced into a twisted position.

Figure 8:
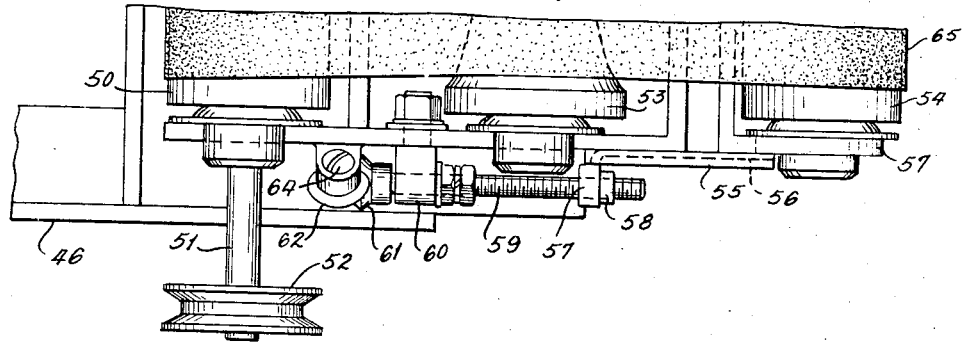
Fig. 8 is a fragmentary plan view of the apparatus shown in Fig. 4, the present detail being on an enlarged scale to reveal details thereof.
Figure 9:
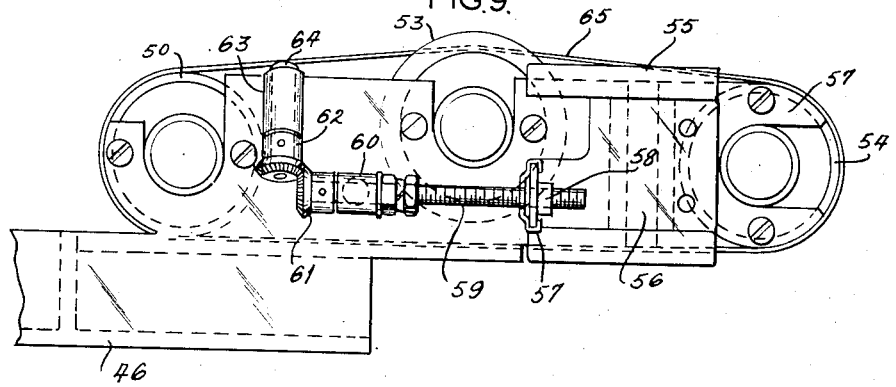
Fig. 9 is a side elevational view of the portions of the apparatus disclosed in Fig. 8.

It will be observed in Fig. 4 particularly, and in Figs. 6 and 8, that the power roll 50 and the idler roll 54 are adapted to support a grinding belt 65 of any suitable character, for example a belt of flexible backing material coated with a suitable abrasive. The belt will normally run in a centered position on the rolls 50 and 54 if the rolls are arranged in parallel relationship. Therefore, it is important to have the adjustable idler roll 54 parallel with the power roll 50, but it is possible by adjusting one or the other of the shafts 64 to cause the belt to move laterally, whereby lateral adjustment of the belt is obtained with respect to the grinding assembly 45. The belt 65 is adapted to be supported and backed up by the formed grinding roll 53, the relation of the rolls 50, 53 and 54 being especially clear in Figs. 6 and 8. The ideal position for the apparatus 10 with respect to the tire T is illustrated in Fig. 6 where the phantom outline of the tire T is shown with its center vertically above the axis of the back-up roll 53. It is also indicated in Fig. 2 that the axis of the roll 53 has been brought into parallel relation with the axis of the tire T by means of the plumb bar 24. In order to obtain vertical alignment between the axis of roll 53 and the axis of tire T, the frame 11 is provided with indicator means 66, one of which is shown in Fig. 1 as being located on an upper surface of the frame 11 and in alignment with the axis of the roll 53. The support rod 22 for the plumb gauge is mounted at this indicator means 66.

The frame 46 carrying the foregoing described grinding assembly is adapted to swing about the axis of the pivot 47 as seen in Fig. 6. The full line position of the frame 46 and the broken line position thereof indicates the position of relative movement of the grinding assembly with respect to the frame 11. This movement permits relative adjustment of the grinding belt upwardly or downwardly within the opening 12 of the frame 11 so that the grinding belt may be adjusted with respect to the tread of tire T for making very light or very heavy cuts or some intermediate weight of cut. The means for adjusting the position of the grinding assembly 45 is shown particularly in Figs. 4 and 6. This means includes an adjustable knob 67 near the rearward end and at one side of the frame 11, the knob being connected to the outer end of a threaded shaft 68. The shaft 68 moves longitudinally through a fixed threaded bushing 69 carried in the frame 11. The knob 67 is provided with a shank 70 which has a sliding fit in the outer end of an aperture which receives the bushing 69, and the shank 70 may be provided with index lines or other suitable indicia (not shown) whereby the inward and outward displacement of the knob 67 and shank 70 can be utilized to indicate the extent of displacement of the grinding assembly 45 as previously described. The shaft 68 is guided near its lower end in a support bushing 71 carried in a suitable bracket 72. The lower end 73 of shaft 68 is adapted to engage a wear plate 74 which also functions as a thrust element for transmitting axial displacement of the shaft 68 into the frame 46, thereby causing the frame 46 to move about its pivot 47. Since the grinding assembly 45 pivots about one end of the frame 46, the weight of this assembly is sustained by a suitable lift spring 75 shown particularly in Figs. 4 and 7. The upper end of spring 75 is anchored in a boss 76 on the interior of the frame 11, and the lower end of this spring engages an anchor pin 77 fixed in a side of the frame 46. It should now be clear that the spring 75 exerts a constant upward force on the grinding assembly 45, whereas the lower end 73 of the shaft 68 acts as an adjustable stop for this upward movement so that the grinding assembly is provided with an upper limit of movement at all times, but is free to be displaced downwardly against the tension in spring 75. The downward displacement of the grinding assembly 45 is useful to permit the assembly to move downwardly whenever a high spot on the tire tread passes the back-up roll 53 for the grinding belt 65. Whenever such a high spot passes the roll 53, the spring 75 will raise the grinding assembly 45 to its adjusted fixed position against the lower end 73 of shaft 68. Without such an arrangement for controlling the upward position of the grinding assembly 45, while permitting yielding displacement of this assembly downwardly, the grinding belt 65 would in operation ride continuously on the tread of the tire and it would be impossible to remove high spots and obtain a rounded condition of the tread.

The means for driving the power roll 50 is an electric motor 80 suitably mounted on frame 46 near the pivot 47, reference being directed particularly to Figs. 4 and 5. The motor 80 is protected by a suitable enlargement 81 of the frame 11, as shown in Fig. 5. The shaft 82 of this motor carries a drive pulley 83 which is connected by a belt 84 to the driven pulley 52 associated with the power roll 50. Since the power roll and the motor are carried on the same frame and move together, this arrangement of belt drive requires merely the usual adjustment of the motor 80 on the frame 46 to obtain proper tension in the drive belt 84.

The present apparatus also includes means for spinning the vehicle wheel so that the tire T may be caused to rotate simultaneously with the grinding belt 65. This spinning means includes a roll 85 which is best seen in Figs. 1 and 7. The mounting for the tire spinning roll 85 is shown in Figs. 4, 5 and 6. Reference will now be had to the several views of the drawing as above indicated. The tire spinning roll 85 is carried on a shaft 86 which, in turn, is suitably journaled in a yoke type frame 87, the spaced arms 88 of which are adapted to be pivotally connected to bosses 89 in the interior of frame 11 (see Fig. 4). The yoke frame 87 is provided with a depending side support 90 which is adapted to carry a pinion gear 91, and this gear 91 is fixed on a shaft 92 which also carries a pulley 93. The pulley 93 is connected by a suitable belt 94 to a pulley 95 on motor shaft 82. The pinion 91 is adapted to mesh with a second pinion 96 which is fixed at the outer end of the shaft 86 for the wheel spinning roll 85. This arrangement of pinion gears and pulleys between motor 80 and the roll 85 is adapted to cause rotation of the tire T in a direction opposite to the linear movement of the grinding belt 65. In other words, the tread of the tire is adapted to move in a direction counter to the direction of the grinding belt for the purpose of reducing the necessary speed of the belt or the tire so that the heat of grinding may be kept as low as possible, to the end that the material removed from the tire tread will not reach a temperature causing it to stick or gum up in the abrasive surface of the belt 65. A quick and speedy job of grinding can be best obtained by avoiding any gumming of the grinding belt, thereby making the belt effective as a means for removing material from the tire tread.

The yoke frame 87 is adapted to pivot independently of the frame 46 and in an opposite sense about the pivot bosses 89. In order to keep the wheel spinning roll 85 in a position engaging the tire T, the yoke frame 87 is provided with an anchor pin 97 to engage the lower ends of two lift springs 98, the lift springs 98 being respectively anchored at their upper ends at spaced points in the frame 11 as shown in Fig. 7. The springs 98 permit downward yielding of the spinning roll 85 so that this roll may respond to high and low spots in the tire tread while maintaining sufficient frictional contact with the tire to keep the tire at approximately the desired speed to make the grinding action of the belt 65 effective.

Turning now to Figs. 5, 6 and 7 it can be seen that the side or skirt of the body frame 11 is provided with an elongated opening 100 which is somewhat larger than the grinding belt 65 for the purpose of permitting the grinding assembly 45 to be adjusted to a position opposite the opening 100 for the purpose of removing or installing the grinding belt 65. The grinding assembly 45 can be conveniently fixed opposite the opening 100 by suitable adjustment of the knob 67 against the wear plate 74. It is necessary that the adjustable idler roll 54 be brought inwardly toward the power roll 50 to develop sufficient slack in the grinding belt 65 to allow the belt to be slipped sidewise from the grinding assembly 45 through the opening 100.

The present tire truing apparatus is compactly arranged within the body frame 11 and is rendered conveniently mobile by reason of the wheels 14 and the maneuvering handle 18. The electric motor 80 is supplied with current through a suitable electric cord 101, and a suitable switch can be provided either in the cord 101 or in the body 11 as desired.

The present apparatus fully attains all of the foregoing objects and possesses the advantage of being capable of truing up vehicle tires easily and rapidly. The necessity for truing up or rounding vehicles tires is to assist in balancing the tires under dynamic conditions where lopsidedness, high spots, and cupping increase the difficulty of obtaining substantially correct balancing. The apparatus is also provided for safety reasons as tires wear unevenly and hence more rapidly when high spots or undue vibration are present. Furthermore, the present apparatus embodies in one compact assembly all of the necessary means whereby vehicle tires may be rounded and trued up while on the vehicle. Other advantages of the present apparatus should now be appreciated from the foregoing detailed description of a preferred embodiment thereof. It is especially noted that the runout gauge 25 can be utilized at all times to indicate the progress of the grinding belt on the tire tread, so that excessive grinding will not take place when the tire has been brought within certain recommended tolerances of concentricity, or eccentricity with respect to the axis of rotation of the wheel assembly. Once a vehicle tire has been brought within the allowable tolerances, and has been balanced for dynamic conditions, the tire will be found to run smoothly and quietly and will improve riding quality and comfort of the vehicle.

Reference has been made to a formed grinding roll 53 in the grinding assembly 45. This roll 53 is located in the zone of the abrasive belt 65 engaging the tread of the tire T and the roll backs up the belt to effect the grinding or cutting action. Normally, the tire tread has a certain degree of lateral curvature or tread crown, hence the roll 53 is formed with a curved face which simulates the tread crown curvature, as best seen in Figs. 2, 4 and 8.

It is obvious that changes may be made in the construction and arrangement of the parts and means above described, and it is desired to cover such changes, modifications or alterations within the scope of the annexed claims.

What is claimed is:

1. Tire rounding apparatus including a supporting casing, a pair of frames operatively mounted in said casing to pivot in opposite directions relative to each other and to pivot toward and away from the tire, tire grinding means carried by one frame and comprising an abrasive belt, spaced belt rolls and a formed grinding roll adapted to back up said belt, said rolls being arranged with their axes substantially parallel, tire spinning means carried by the other of said frames, a motor carried by said one frame and having an operative connection with said grinding means, drive connection means between said motor and said spinning means, and means on said casing adapted to laterally tilt and vertically elevate said apparatus to bring said formed grinding roll axis into substantially parallel relationship with the tire axis.

2. Tire rounding apparatus including a supporting casing, a pair of frames operatively mounted in said casing to pivot in opposite directions relative to each other and toward and away from the tire, tire grinding means carried by one frame comprising an abrasive belt, spaced belt rolls and a back-up roll intermediate said belt rolls, said rolls being arranged with their axes substantially parallel, one of said belt rolls being adjustable toward and away from the other of said belt rolls for adjusting the tension of said abrasive belt, tire spinning means carried by the other of said frames, a motor mounted on said one frame and having an operative connection with said grinding means, and drive connection means between said motor and said spinning means.

3. Tire rounding apparatus including an enclosing casing; a pair of frames operatively mounted in said casing to pivot in opposite directions relative to each other and toward and away from the tire; tire grinding means carried by one frame comprising an abrasive belt, spaced belt rolls and a back-up roll therebetween, said rolls being mounted with their axes substantially parallel, one of said belt rolls being adjustable toward and away from the other of said belt rolls for adjusting the tension of said abrasive belt and for permitting removal of said abrasive belt from the belt rolls, said casing being provided with a side opening through which said belt may be removed, and means for positioning said grinding means opposite to the side opening of said casing; tire spinning means carried by the other of said frames; a motor mounted on said one frame and having an operative connection with said grinding means, and drive connection means between said motor and said spinning means.

4. A tire truing apparatus adapted to be positioned beneath the raised wheel of a vehicle for truing a tire mounted thereon, said apparatus comprising a casing having a tire receiving opening; a grinding assembly including a frame hingedly mounted at one end on said casing and having an unattached end adapted to move toward and away from said tire receiving opening, a drive roller journaled in said frame, an idler roller rotatably mounted in spaced parallel relation with said drive roller on said frame, a back-up roller journaled in said frame intermediate said drive and idler rollers, a continuous belt having an abrasive surface, said belt extending around said drive and idler rollers, and a motor mounted on said frame and connected to said drive roller for driving said belt over said back-up roller; yieldable means urging said grinding assembly toward said tire receiving opening; adjustable stop means limiting movement of said grinding assembly toward said tire receiving opening; tire rotating means adapted to effect the continuous rotation of the tire and including a tire contacting roller rockably mounted on the casing adjacent to the tire receiving opening, means yieldably urging said tire contacting roller into a position in said tire receiving opening, and drive means connected to said motor and said tire contacting roller for rotating the latter in a direction opposite to the direction of movement of said belt; gauge means on said frame adapted to contact the surface of the tire to be trued to indicate changes therein; and other means carried by said casing and adapted to align the axis of the vehicle wheel with the axis of the back-up roller.

References Cited in the file of this patent

UNITED STATES PATENTS

| | | |
|---|---|---|
| 1,303,387 | Pogue | May 13, 1919 |
| 2,197,077 | Littlefield | Apr. 16, 1940 |
| 2,649,665 | Anderson | Aug. 25, 1953 |
| 2,651,893 | Braley | Sept. 15, 1953 |
| 2,706,873 | Gifford | Apr. 26, 1955 |
| 2,712,207 | Cochran | July 5, 1955 |
| 2,766,563 | Bennett | Oct. 16, 1956 |